United States Patent [19]
Heine et al.

[11] Patent Number: 6,140,790
[45] Date of Patent: Oct. 31, 2000

[54] ACTIVE ELECTROMAGNETIC DAMPING SYSTEM FOR SPINDLE MOTORS

[75] Inventors: Gunter K. Heine, Aptos; Hans Leuthold, Santa Cruz, both of Calif.; Christian Fleury, Rossemaison, Switzerland

[73] Assignee: Seagate Technology LLC, Scotts Valley, Calif.

[21] Appl. No.: 09/029,044

[22] PCT Filed: Mar. 19, 1997

[86] PCT No.: PCT/US97/04277

§ 371 Date: Feb. 24, 1998

§ 102(e) Date: Feb. 24, 1998

[87] PCT Pub. No.: WO97/36361

PCT Pub. Date: Oct. 2, 1997

Related U.S. Application Data

[60] Provisional application No. 60/014,178, Mar. 26, 1996.

[51] Int. Cl.$^7$ .................................................. G05B 5/01
[52] U.S. Cl. ............................................. 318/611; 310/51
[58] Field of Search .................................. 318/460, 611, 318/623, 629; 310/51; 74/5.5

[56] References Cited

U.S. PATENT DOCUMENTS

| | | |
|---|---|---|
| 3,608,383 | 9/1971 | Hunter et al. . |
| 3,891,285 | 6/1975 | Atkinson . |
| 3,974,434 | 8/1976 | Yablonski ............................ 318/696 |
| 4,352,481 | 10/1982 | Forward . |
| 4,626,754 | 12/1986 | Habermann et al. .................. 318/460 |
| 4,848,169 | 7/1989 | Duncan et al. . |
| 5,138,883 | 8/1992 | Paquet et al. . |
| 5,416,976 | 5/1995 | Hane et al. ............................ 33/326 |

*Primary Examiner*—Bentsu Ro
*Attorney, Agent, or Firm*—Flehr Hohbach Test Albritton & Herbert LLP

[57] ABSTRACT

A method of damping resonances in a rotating system is disclosed, which includes developing a representation of vibrating movement in the rotating system, taking the derivative of that representation and applying an out-of-phase active damping force based on the derivative to the rotating system to damp out the movement.

22 Claims, 12 Drawing Sheets

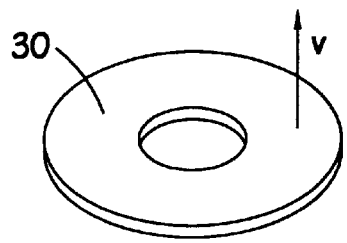
FIG. 3
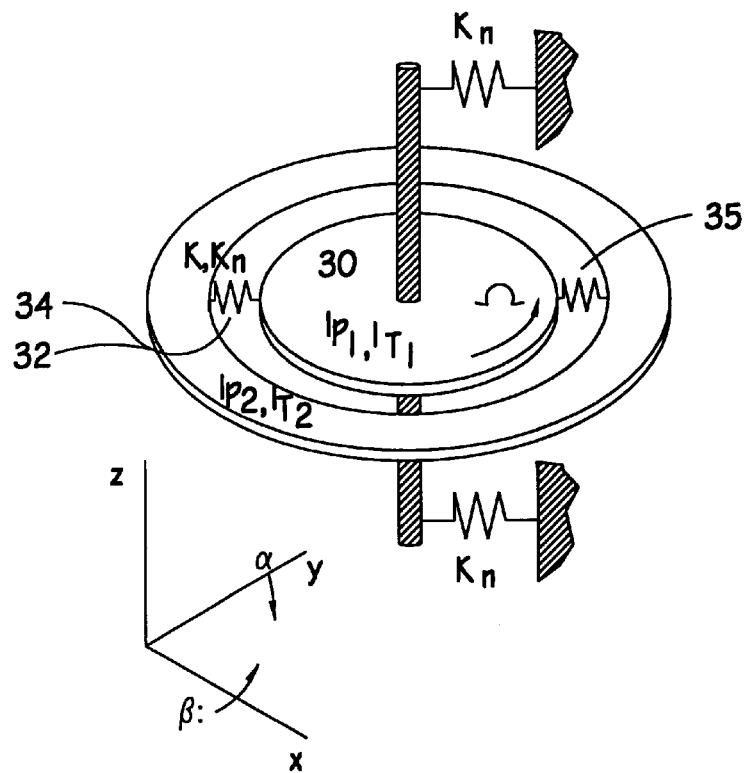
FIG. 4
FIG. 5

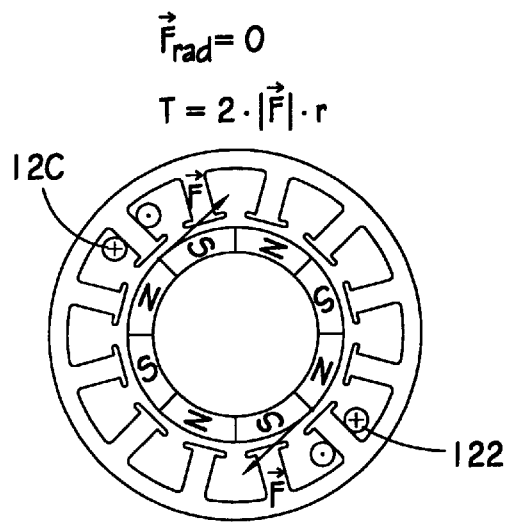
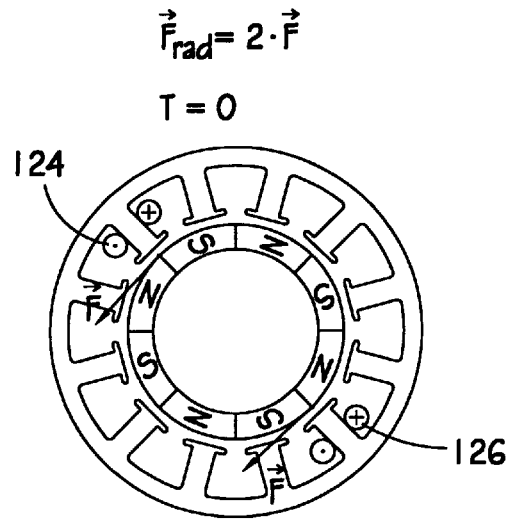
FIG. 13A
FIG. 13B
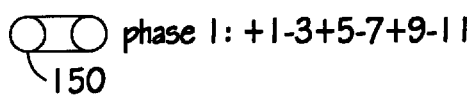
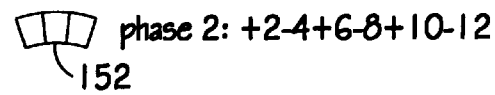
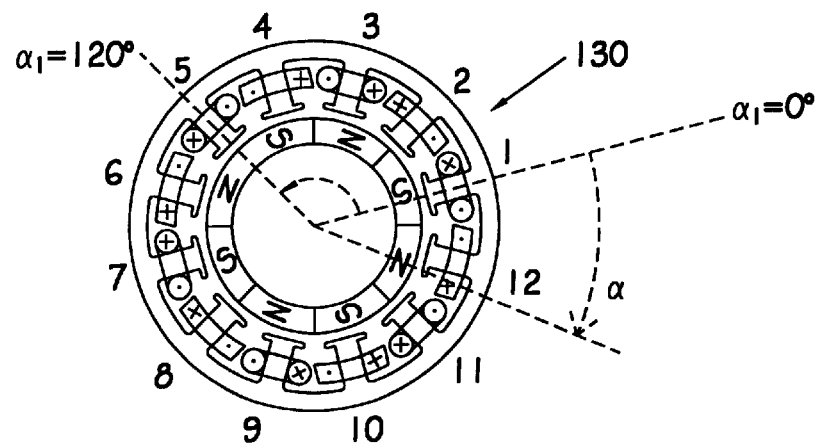
FIG. 14

ACTIVE ELECTROMAGNETIC DAMPING SYSTEM FOR SPINDLE MOTORS

CROSS-REFERENCE TO RELATED APPLICATIONS

This application is a utility filing of Provisional Patent Application No. 60/014,178 filed Mar. 26, 1996 entitled, "ACTIVE ELECTROMAGNETIC DAMPING SYSTEM FOR SPINDLE MOTORS". This application is a National Stage of International Application, PCT/US97/04277, under 35 USC §371, filed Mar. 19, 1999.

This invention is useful with the actuator disclosed in U.S. patent application Ser. No. 09/029,043, entitled "BRUSHLESS SPINDLE DC MOTOR USED AS AN ACTUATOR TO CREATE RADIAL FORCE" by inventors Gunter Heine, et al., filed simultaneously herewith and incorporated herein by reference.

FIELD OF THE INVENTION

The present invention relates generally to motors and the vibrations or resonances which are set up within such motors; particular applications or examples will be given with respect to spindle motors used in disc drive assemblies, but the application of this invention is not limited to these specific examples.

BACKGROUND OF THE INVENTION

Most motors, indeed most rotating systems that are spinning about a fixed axis, have vibrations or harmonics which are set up and become part of the system, disturbing the overall stability and smooth operation of the system. Such problems are particularly acute in the disc drive industry, where a spindle motor mounts and supports a disc or disc pack for high speed rotation. The disk drive industry is continually seeking to obtain a head disc assembly (HDA) capable of operating with an increased track density which requires greater resistancy to shock and vibration.

As the operating demands on the HDA increase, problems associated with conventional HDA systems become performance limiting factors: for example non-repetitive run-out (NRR) associated with conventional ball bearings limits track spacing and thus, reduces the track density at which the HDA can reliably operate. NRR is associated with the highly complex dynamic behavior of the hard disk drives: mechanical modes of the motor and the disc pack correspond to predicted mechanical resonance, which are in turn excited by ball bearing vibration. To reduce NRR magnitude, the vibrational characteristics of the drive have to be modified.

In the prior art, a number of efforts have been made to electronically damp vibration associated with a motor or with a transducer in a disc drive. The prior art to damp vibrations in a moving transducer in order to more quickly center it on a track includes U.S. Patents to Song, U.S. Pat. No. 4,414,497; Sidman, U.S. Pat. No. 5,459,383, and Ravizza, U.S. Pat. No. 4,080,636. Each of these comprise elaborate circuitry for adding feedback loops to more quickly damp out the vibrations or movements in a moving transducer. All of these are not associated with problems of damping out vibrations in a motor or the disc itself, and also add considerable complexity and cost to the system.

Other patents have added mechanical or electromechanical elements to the motor itself in an effort to damp out vibrations in the motor. These patents include Hasigawa, U.S. Pat. No. 5,317,466; Bartec, U.S. Pat. No. 4,198,863; and Clancey, U.S. Pat. No. 4,286,202. These patents are especially directed to the addition of mechanical or electromechanical elements to motors to detect and damp out vibration. Again, these prior art approaches have not proven to be effective in detecting the resonance modes which can exist in rotating motors and particularly disc drive spindle motors, and damping out such resonances. Further, they add considerable cost and complexity to the motor design.

SUMMARY OF THE INVENTION

Therefore, an object of the present invention is to damp out the resonances which occur in a rotating system.

A related objective is to stabilize the spin axis of a rotating system in a given position.

It is a further objective of this invention to accurately simulate the undamped resonant movements of the rotating system, and then to apply an out of phase force to the rotating system to damp out the resonant movements.

It is a further objective and a related objective of the invention to apply an out of phase force which accurately and repeatably damps or attenuates the resonant movements and thereby stabilizes the system.

In this invention, the term "attenuation" is directly related to the fact that the force applied is out of phase with the resonant movements within the system. This is as opposed to the idea of adding a force which directly opposes the resonances which are occurring within the system, which would thereby add stiffness to the system, and constitutes the approach taken by the prior art. This would be the approach taken by an electromagnetic bearing, or the like, being added to the system.

Thus, in the present invention, resonant movements are first simulated, and then a derivative of that representation is utilized to define a damping signal, lagging in phase, which controls the application of force to the system to damp out the resonance within the system. Thus, the damping method taught by this invention comprises measuring the movements of the system in time, and then lagging that very same force by ninety degrees and applying that damping force to correct the tendency for that movement to occur. Thus, according to the invention a movement at a given velocity is countered by a counter movement at a given velocity, so that movements at high frequency are successfully damped out. The success of this approach is based in part on the fact that the derivative of the representation of the movement always has velocity as a factor in its representation of the resonant movements of the rotating system. Thus, at higher frequency movements, this damping approach is substantially more effective than the addition of stiffness to the system.

Other features and advantages of the present invention will become apparent to a person of skill in the art who studies the present invention disclosure, given with respect to the following figures.

BRIEF DESCRIPTION OF THE DRAWINGS

FIGS. 3, 4 and 5 illustrate disc shapes as analyzed in this model.

FIGS. 13A and 13B illustrate a modified motor design to create a radial force on the magnet, and the result achieved by the modification.

FIG. 14 is a more detailed example of the windings used to generate the radial force.

DETAILED DESCRIPTION OF A PREFERRED EMBODIMENT

The following description of an exemplary preferred embodiment is given with reference to a disc drive spindle motor. However, the principles described in this example are applicable to other motors and rotating systems as well.

Figure 1A:
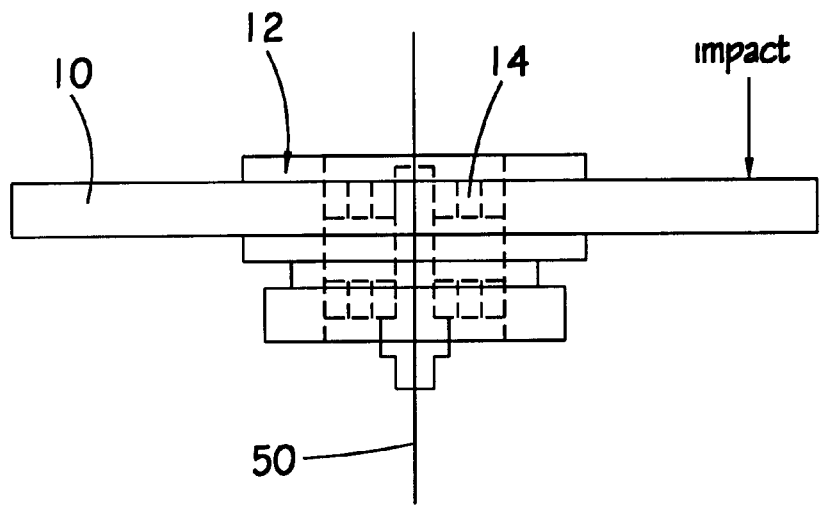
FIG. 1A is a model of a disc submitted to an impact.
Figure 6:
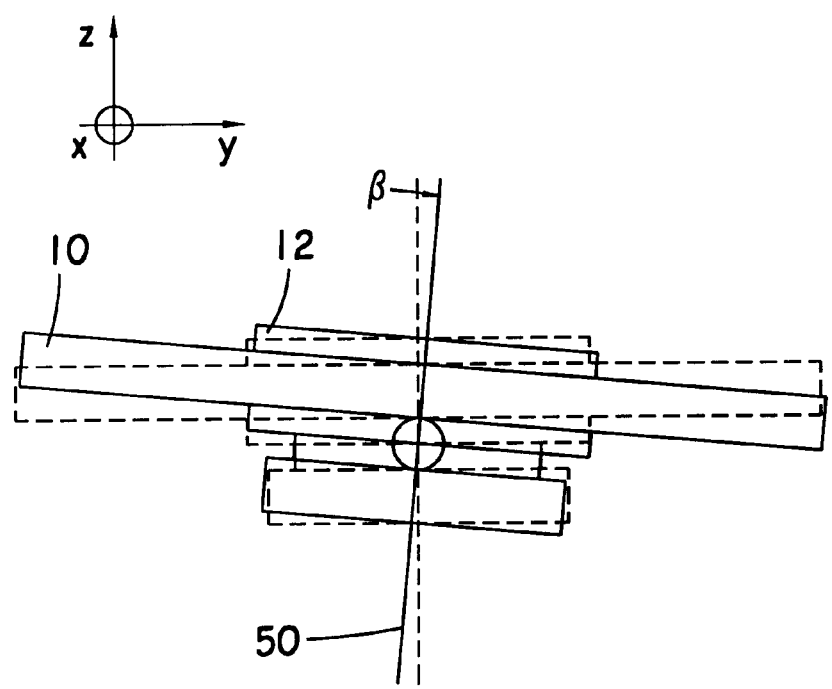
FIG. 6 illustrates the angular rotation of a disc in response to an impact.

In general, a spindle motor can be characterized as a rotational inertia (comprising a rotor 10 and the disc pack support 12) mounted on a pair of flexible bearing supports 14, as shown in FIG. 1A. For the case of ball bearings, the mechanical damping of the supports is very small. This leads to a resonant mechanical system; the rotating axis of the rotational inertia is subject to some resonant movement.

The following will first present a model capable of predicting the dynamic behavior of a disc drive. When a rigid motor mounted on two flexible bearing supports is considered, as it is in this model, the predicted mechanical resonances of the motor and disc pack are the five mode shapes shown in FIG. 2; these are forward and backward rotating gyroscopic mode, a forward and back created rotating cylindrical mode, and an axial mode.

NOMENCLATURE

| | |
|---|---|
| $d_n$ | Bearing n pitch diameter |
| D | Flexural rigidity of plate |
| $E_1$ | Radial stiffness of bearing cartridge |
| $E_2$ | Cross-coupled stiffness of bearing cartridge |
| $E_3$ | Rotational stiffness of bearing cartridge |
| $E_4$ | Axial stiffness of bearing cartridge |
| h | Plate thickness |
| $I_{Pn}$ | Polar mass movement of inertia of segment n |
| $I_{fn}$ | Transverse mass movement of inertia of segment n |
| $k_a$ | Flexible disc axial stiffness |
| $k_r$ | Flexible disc rotational stiffness |
| $K_n$ | Stiffness of one ball of bearing n along the line of contact |
| $l_n$ | Distance from center of mass to center of bearing n, in the z direction |
| $m_n$ | Mass of segment n |
| T | Kinetic Energy |
| V | Potential Energy |
| v | Transverse plate |
| x | Displacement in the x coordinate direction |
| y | Displacement in the y coordinate direction |

-continued

NOMENCLATURE

| | |
|---|---|
| z | Displacement in the z coordinate direction |
| α | Angular rotation about the y axis |
| β | Angular rotation about the x axis |
| $\phi_n$ | Bearing n contact angle |
| ρ | Density |
| $\omega_{(n,m)}$ | Eigenvalue of the (n,m) mode |
| Ω | Rotational Velocity about the z axis |

The rapid increase in disc drive capacities over the past several years has forced adjacent data tracks closer and closer together. In today's highest density drives, track spacing is on the order of 5 μm, approaching 2.5 then 1 μm. For this reason, it is more important today than ever that the dynamic behavior of the disc drive be well understood. It is necessary to be able to predict the natural frequencies and mode shapes of the drive because these vibrations can affect the accessibility of the data. These vibrations show up as positioning errors in the drive's servo control loop, and if large enough, can prevent the drive from staying on track.

Two models are given in David Jennings, "ROTOR DYNAMICS OF A BALL BEARING SPINDLE MOTOR WITH HIGH INERTIAL LOAD AND LOW MECHANICAL DAMPING", Proceeds of the 21st Annual Symposium on Incremental Motion Control Systems and Devices (IMSCD), Champaign, Ill., June, 1992, pp. 97–104, incorporated herein by reference.

This paper presents a lumped parameter model that incorporates, without the use of any fudge factors, the necessary parameters for accurately determining the eigenvalues and mode shapes for a disc drive. These include the bearing stiffness and disc flexibility. The results obtained from this model are then compared to experimental measurements of both disc vibration and servo position error for a complete drive.

RIGID DISC MODEL

Figure 1B:
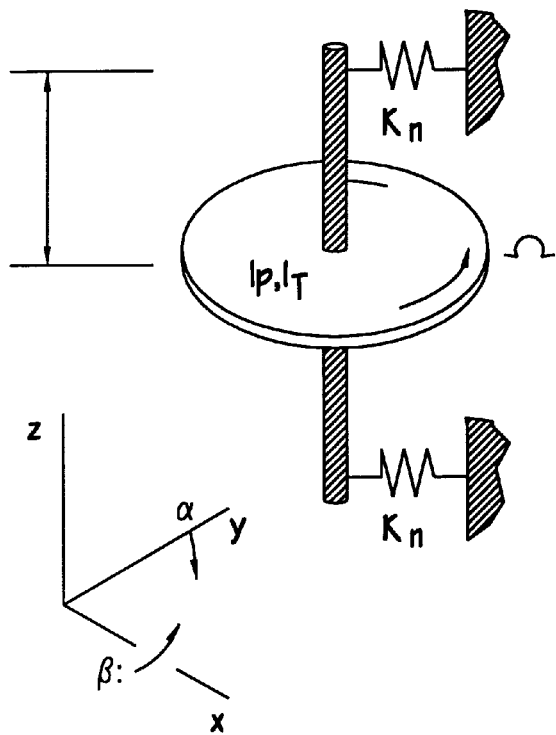
FIG. 1B is a model representing a disc mounted for rotation.

Consider first the system depicted in FIG. 1B. A rigid rotor mounted on two flexible bearing supports.

Deriving the equations of motion in the standard Langrangian way gives the following set of equations:

$$\begin{bmatrix} m & 0 & 0 & 0 \\ 0 & m & 0 & 0 \\ 0 & 0 & I_t & 0 \\ 0 & 0 & 0 & I_t \end{bmatrix} \begin{bmatrix} \ddot{x} \\ \ddot{y} \\ \ddot{\beta} \\ \ddot{\alpha} \end{bmatrix} + \Omega \begin{bmatrix} 0 & 0 & 0 & 0 \\ 0 & 0 & 0 & 0 \\ 0 & 0 & 0 & I_p \\ 0 & 0 & -I_p & 0 \end{bmatrix} \begin{bmatrix} \dot{x} \\ \dot{y} \\ \dot{\beta} \\ \dot{\alpha} \end{bmatrix} + \quad (A)$$

$$\begin{bmatrix} E_1 & 0 & 0 & E_2 \\ 0 & E_1 & -E_2 & 0 \\ 0 & -E_2 & E_3 & 0 \\ E_2 & 0 & 0 & E_3 \end{bmatrix} \begin{bmatrix} x \\ y \\ \beta \\ \alpha \end{bmatrix} = \vec{0}$$

and $m\ddot{z} + E_4 z = 0$

These four terms, $E_1$ through $E_4$, are the radial, cross-coupled, rotational, and axial stiffness of the two bearing cartridge respectively. They depend on the linearized stiffness of one ball, measured across the line of contact diameter, for both ball bearings. This ball stiffness is derived from a solution of the Hertz contact problem for the bearing geometry in question.

The eigenvalues and mode shapes for this system of equations can be evaluated numerically. This yields the five mode shapes depicted in FIG. 2. These are a forward 16 and backward 18 rotating gyroscopic mode, a forward 20 and backward 22 rotating cylindrical mode, and an axial mode 24.

FLEXIBLE DISC MODEL

While the rigid disc model gives us a good picture of the basic dynamic behavior of a spindle motor, disc drives are typically characterized by a stack of thin flexible discs mounted on the spindle. The flexibility of these discs plays an important role in the dynamics of the complete drive.

Consider a thin isotropic flat annular plate 30 clamped on the ID and free on the OD, as shown in FIG. 3, where V is the transverse displacement. The eigenvalues and mode shapes of the plate can be found by solving the general equation of motion of the plate.

The solution of the eigenvalue problem results in a series of diametrical and circumferential mode shapes (n,m) with corresponding eigenvalues, as shown in FIG. 4. A complete solution is given in (1) Vance, John M., "Rotordynamics of Turbomachinery", John Wiley & Sons, New York, 1988; (2) Harris, Tedrie A. "Rolling Bearing Analysis", John Wiley & Sons, New York, 1992; (3) Ehreich, Fredric F., Ed, "Handbook of Rotordynamics", McGraw-Hill, New York, 1992; (4) Goldstein, Herbert, "Classical Mechanics", 2nd Ed., Addison-Wesley, 1980; and (5) McLeod, A. J., Bishop, R.E.D., "The Forced Vibration of Circular Flat Plates", Mechanical Engineering Science Monograph No. 1, Institute of Mechanical Engineers, London, 1965; incorporated herein by reference. Of most importance are the (0,0) and (1,0) modes. These are the modes that play the most significant role in the dynamics of the disc drive. These two flexibilities act to lower the axial and gyrational stiffness of the total system.

In order to account for the disc flexibility, the model shown in FIG. 5 is used. This model incorporates a second inertia 32 and set of springs 34, 35 to model the disc. It should be noted that while this addition should accurately predict the effect of (0,0) and (1,0) disc modes, this model does not have enough flexibility to accurately show the influence of the higher order disc modes.

$$\begin{bmatrix} m_t & 0 & 0 & 0 & 0 & 0 \\ 0 & m_t & 0 & 0 & 0 & 0 \\ 0 & 0 & I_{t1} & 0 & 0 & 0 \\ 0 & 0 & 0 & I_{t2} & 0 & 0 \\ 0 & 0 & 0 & 0 & I_{t1} & 0 \\ 0 & 0 & 0 & 0 & 0 & I_{t2} \end{bmatrix} \begin{bmatrix} \ddot{x} \\ \ddot{y} \\ \ddot{\beta}_1 \\ \ddot{\beta}_2 \\ \ddot{\alpha}_1 \\ \ddot{\alpha}_2 \end{bmatrix} + \quad (B)$$

$$\Omega \begin{bmatrix} 0 & 0 & 0 & 0 & 0 & 0 \\ 0 & 0 & 0 & 0 & 0 & 0 \\ 0 & 0 & 0 & 0 & I_{p1} & 0 \\ 0 & 0 & 0 & 0 & 0 & I_{p2} \\ 0 & 0 & -I_{p1} & 0 & 0 & 0 \\ 0 & 0 & 0 & -I_{p2} & 0 & 0 \end{bmatrix} \begin{bmatrix} \dot{x} \\ \dot{y} \\ \dot{\beta}_1 \\ \dot{\beta}_2 \\ \dot{\alpha}_1 \\ \dot{\alpha}_2 \end{bmatrix} +$$

-continued $$\begin{bmatrix} E_1 & 0 & 0 & 0 & E_2 & 0 \\ 0 & E_1 & -E_2 & 0 & 0 & 0 \\ 0 & -E_2 & E_3' & -k_r & 0 & 0 \\ 0 & 0 & -k_r & k_r & 0 & 0 \\ E_2 & 0 & 0 & 0 & E_3' & -k_r \\ 0 & 0 & 0 & 0 & -k_r & k_r \end{bmatrix} \begin{bmatrix} x \\ y \\ \beta_1 \\ \beta_2 \\ \alpha_1 \\ \alpha_2 \end{bmatrix} = \tilde{0}$$

and $$\begin{bmatrix} m_1 & 0 \\ 0 & m_2 \end{bmatrix} \begin{bmatrix} \ddot{z}_1 \\ \ddot{z}_2 \end{bmatrix} + \begin{bmatrix} E_4' & -k_a \\ -k_a & k_a \end{bmatrix} \begin{bmatrix} z_1 \\ z_2 \end{bmatrix} = \tilde{0} +$$

Of the eight modes that this model predicts, of primary interest are the 3 eigenvalues that have the lowest frequencies. For the typical ball bearing spindle these are the forward and backward gyro and the first axial mode. These are the modes with amplitudes high enough to cause positioning errors in the servo control.

An Example That Illustrates the Ability to Modify the Vibrational Characteristics of a Disc Drive by Adding an Active System in Parallel With Standard Mounting.

Pursuant to this example, the spindle motor and discs described above are submitted to a theoretical impact. A simulation based on the equation (A) set out above shows that the rotational axis moves in a rotating gyroscopic mode (which is labeled as a gyro mode in FIG. 2). The following FIGS. 8A, 8B and 8C present the temporal change of the angular rotation $\alpha$, $\beta$ of the rotational axis.

A spindle motor submitted to a theoretical impact is shown in FIG. 1A, the impact being at a distance from the axis of rotation 50 of the disc 10. In the response of the disc system to such an impact, the forward/backward modes are the modes with amplitudes high enough to cause positioning errors in the servo control. FIGS. 6, 7 and 8A–8C describe the angular rotation $\alpha$ and $\beta$ of the rotational axis. For example, in plane view zy shown in FIG. 6, angle $\beta$ defines the angular rotation of the rotational axis about the x axis.

Figure 7:
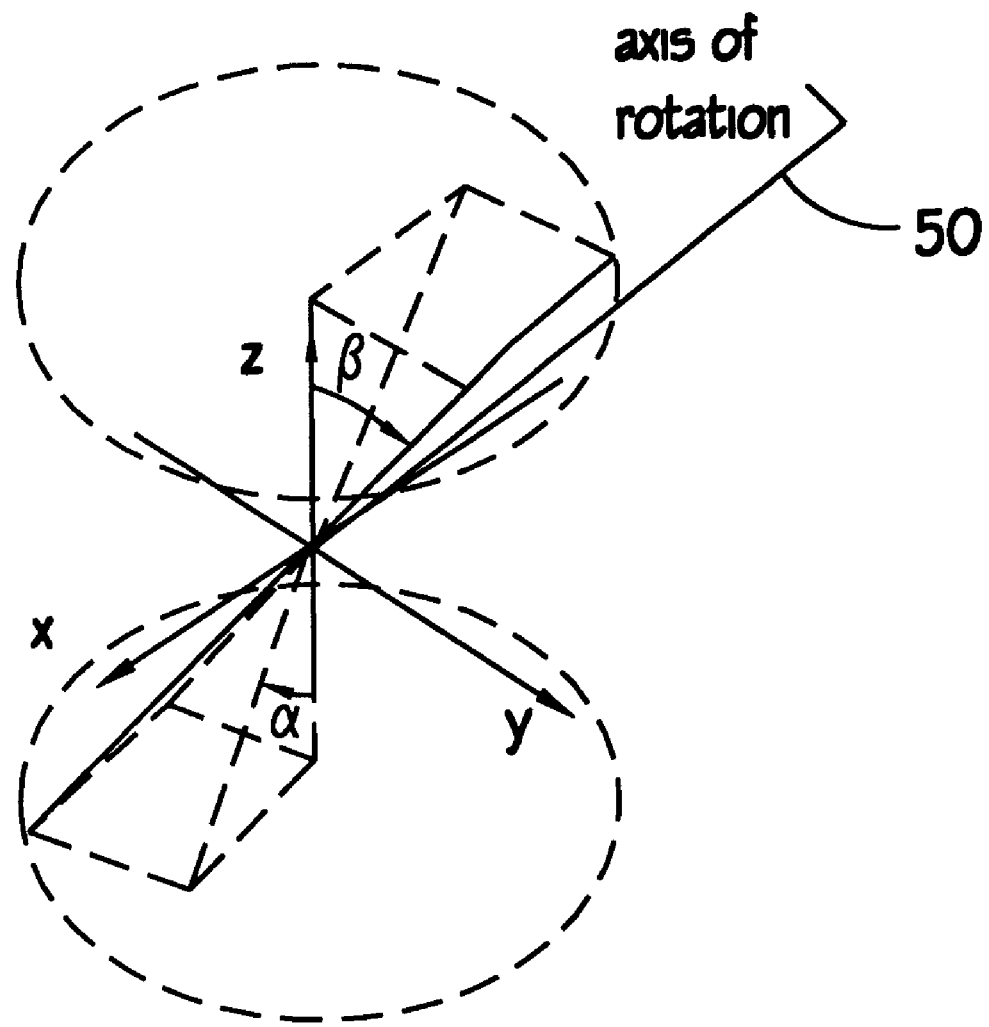
FIG. 7 is an illustration used to explain gyroscopic modes of movement to the system of FIG. 1A.

FIG. 7 more clearly illustrates the angular rotation of the discs' axis of rotation about the x axis ($\beta$) and the y-axis ($\alpha$). A simulation based on the set of equation (A) set out above shows that the rotational axis of the rotating inertia moves then according to a rotating gyroscopic mode. The FIGS. 8A–8C present the temporal evolution of the angular rotation $\alpha$ and $\beta$ of the rotational axis. These figures show an undamped resonant movement of the rotor and disc pack.

Figure 8A:
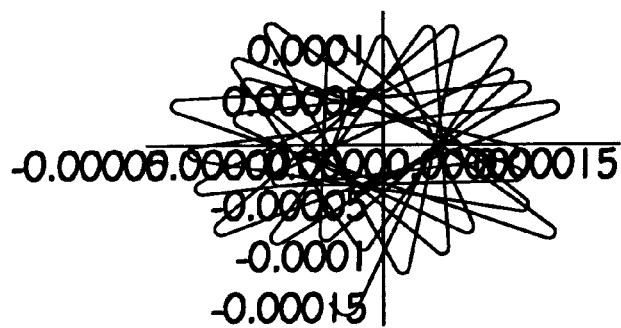
FIGS. 8A, 8B and 8C illustrate the resonant movement of the rotor and disc pack after impact.
Figure 8B:
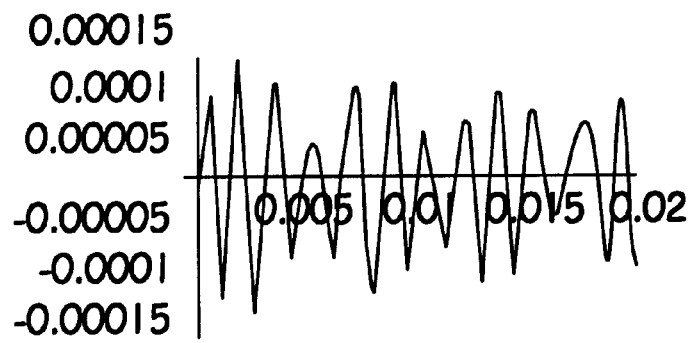
Figure 8C:
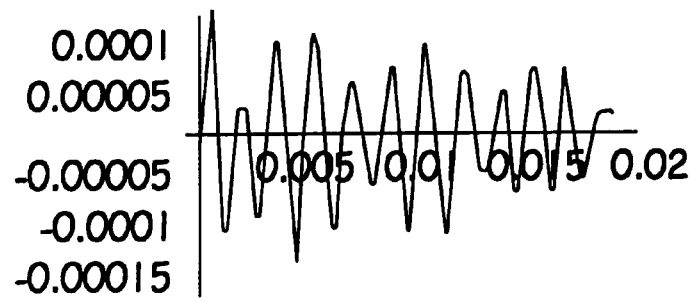

FIG. 8A is a parametric plot of $\alpha$ and $\beta$ ([rad]) as a function of time. Shown separately, FIG. 8B is a plot of $\alpha$ ([rad]) in function of the time ([s]); and FIG. 8C is a plot of $\beta$ ([rad]) in function of the time ([s]).

Once the plot $\alpha$, $\beta$ of the gyroscopic movement of the discs have been measured as a function of time, then according to this invention, the damping can be adjusted electronically by taking the derivative of the representation of the measured oscillation of the disc or rotating body. This derivative is used as a control signal to an electromagnetic or equivalent active damping system having an effectiveness which is modified with time in proportion to the gyroscopic or resonant movement of the disc.

Figure 9:
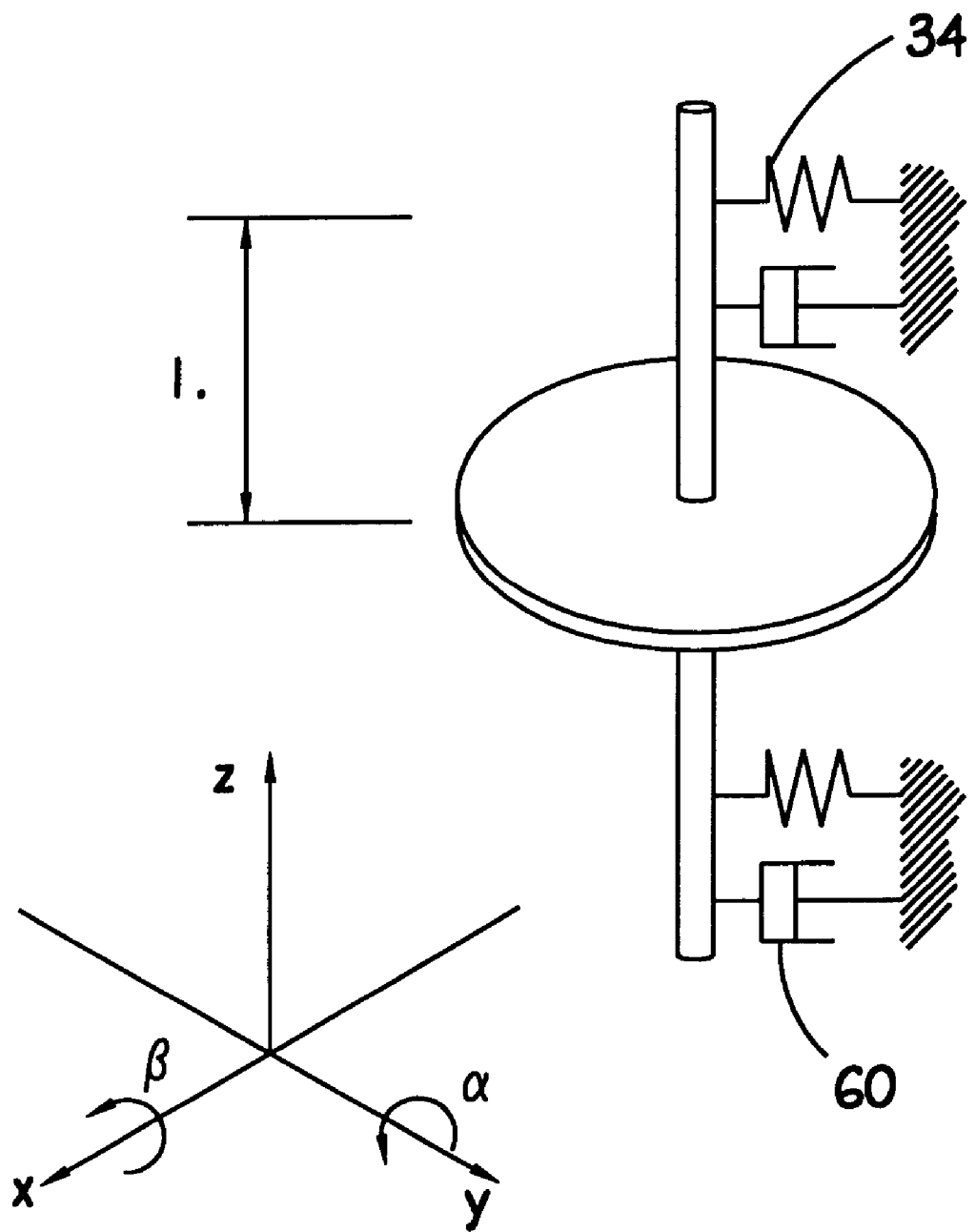
FIG. 9 illustrates the addition of an active damping system to the system of FIG. 1B.
Figure 10A:
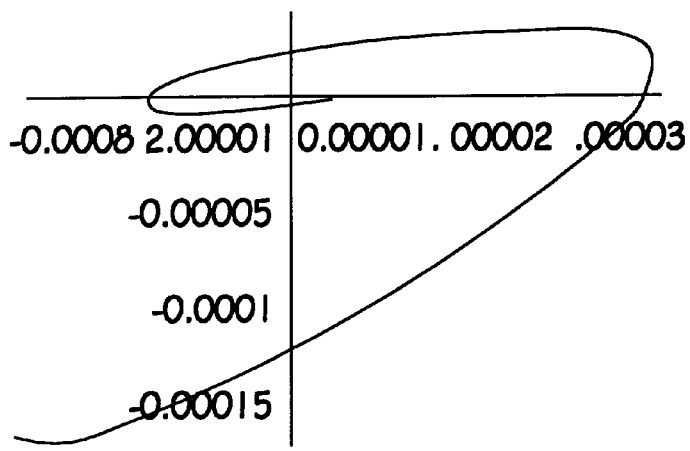
FIGS. 10A, 10B and 10C are plots of the movement of the damped system.
Figure 10B:
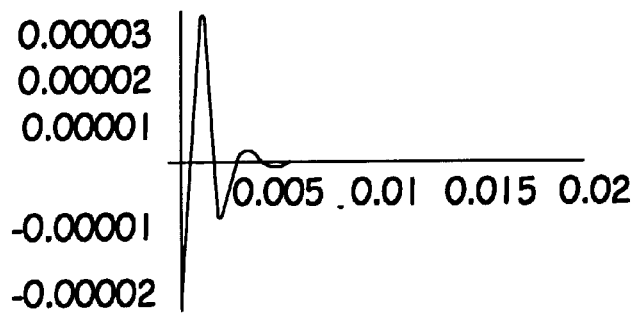
Figure 10C:
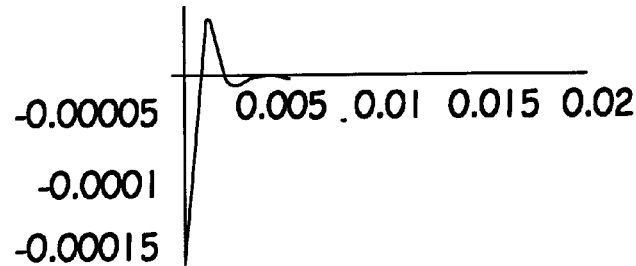

To reduce the magnitude of the oscillation described above, an active system can be added in parallel to the standard mounting which was shown in FIG. 1B, FIG. 5 and FIG. 9. According to this illustration the disc 30, previously supported at mounting 34, now has an additional, active damping support mounting 60. In this simulated example, the active system 60 introduce damping in creating one radial force whose components Fx and Fy are proportional to the derivative of the angular rotation $\alpha$ and $\beta$. A simulation based on the set of equation A (above) shows that the rotational axis of the rotating inertia moves then according to a rotating gyroscopic mode that is rapidly damped by the active system. The results of the introduction of this actively damped system according to the theoretical model, are shown in FIGS. 10A–10C, wherein FIG. 10A is a parametric plot of $\alpha$ and $\beta$ ([rad]) as a function of time; FIG. 10B is a plot of $\alpha$ ([rad]) as a function of time; and FIG. 10C is a plot of $\beta$ ([rad]) as a function of time.

A simulation based on the set of equations A set out above has established that the rotational axis of the rotating inertia would then move according to a rotating gyroscopic mode that is rapidly damped by the active system. Compare FIGS. 10A, 10B and 10C to FIGS. 8A, 8B and 8C, respectively, which show the rapid damping out of the oscillatory movement, these simulations show the results which can be achieved by this method.

An application of the theoretical example given above illustrates the fact that it is possible to modify the vibrational characteristics of the system by adding an active system in parallel with the standard mounting. This example is a practical example and is illustrated by the figures explained below.

In this example, the active system used an actuator which is the motor itself: the stator of the motor is used to apply a radial force directly on the magnet. The FIG. 11 described in plane yz the active system added between the stator and the rotor of the motor itself. In order to create damping, the actuator 60 (in FIG. 9) creates a radial force with its x and y components that are calculated in order to be equal to the derivative of the angular rotation $\alpha$ and $\beta$ of the axis of rotation. The FIG. 12 shows in plane yz the y component of the radial force. This component is proportional to the angular velocity linked to $\beta$. In this example, the actuator used to generate damping force is the spindle itself. The spindle components such as the magnet and the stack are used with an additional winding to generate a radial force which creates the necessary damping.

FIGS. 13A and 13B shows that in supplying a different combination of coils, it is possible to apply on the rotor magnet either a torque (FIG. 13A) or a radial force (FIG. 13B). The difference between FIGS. 13A and 13B results from the directions of current flow in the coil windings. In FIG. 13A, the windings 120, 122 establish current flow in the same direction, producing forces as shown, with a resultant torque. In FIG. 13B, the windings 124, 126 again would on phases spaced 180°, have current flow in opposite directions, producing a desired resultant radial force. By applying currents of a defined magnitude, a resultant force to damp out any vibration maybe created.

The additional 2 phase winding 150, 152 shown in FIG. 14 has been placed in the 12 slots of the 8 pole spindle motor 130. Other slot and pole configurations are available as well. Supplying the 2 phases of this winding with 2 constant currents will generate 2 rotating radial force in quadrature.

Figure 15:
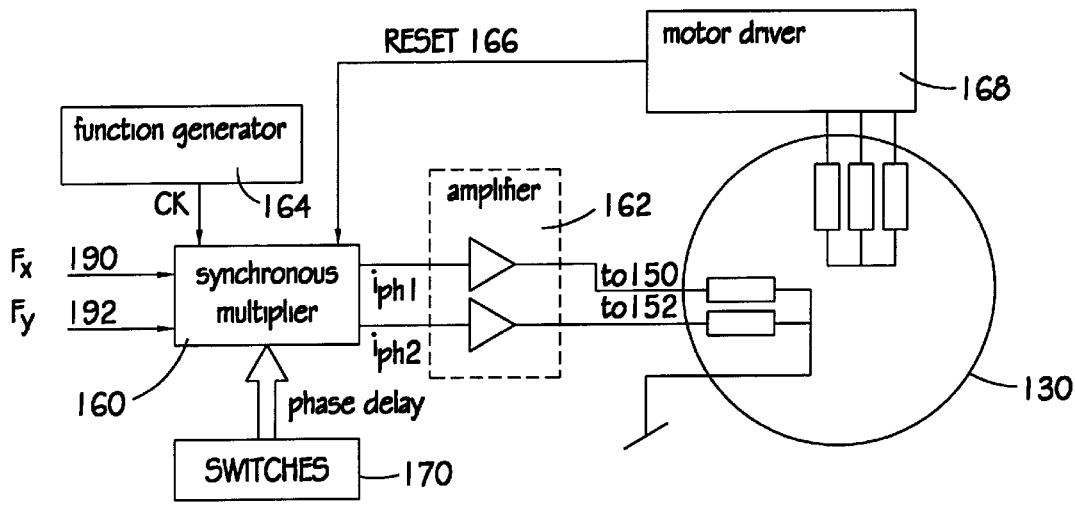
FIGS. 15 and 16 are block diagrams of circuits to detect movement to be damped, and to supply currents to windings of the motor of FIG. 14.

FIG. 15 shows a block diagram of the electronics supplying the 2 phase winding of FIG. 14 to generate a radial force given by its Cartesian components Fx and Fy. The synchronous multiplier processes the 2 current consigns ($i_{ph1}$ and $i_{ph2}$) as a function of the radial force Cartesian components (Fx and Fy), which represent the applied impulse. Two current amplifiers 162 are then used to supply the 2 phase radial force generating windings 150, 152.

Three other inputs have to be provided for the synchronization of the synchronous multiplier 160:

an input clock CK 164 with a frequency proportional to the motor speed; the signal can be generated by a function generator for constant speed applications;

a RESET signal 166 with one pulse per electrical period; this signal can be provided by the motor driver 168 which supplies the normal drive currents to the motor 130;

a switch programmed phase delay 170 that allows a direction adjustment of the generated radial force.

Figure 16:
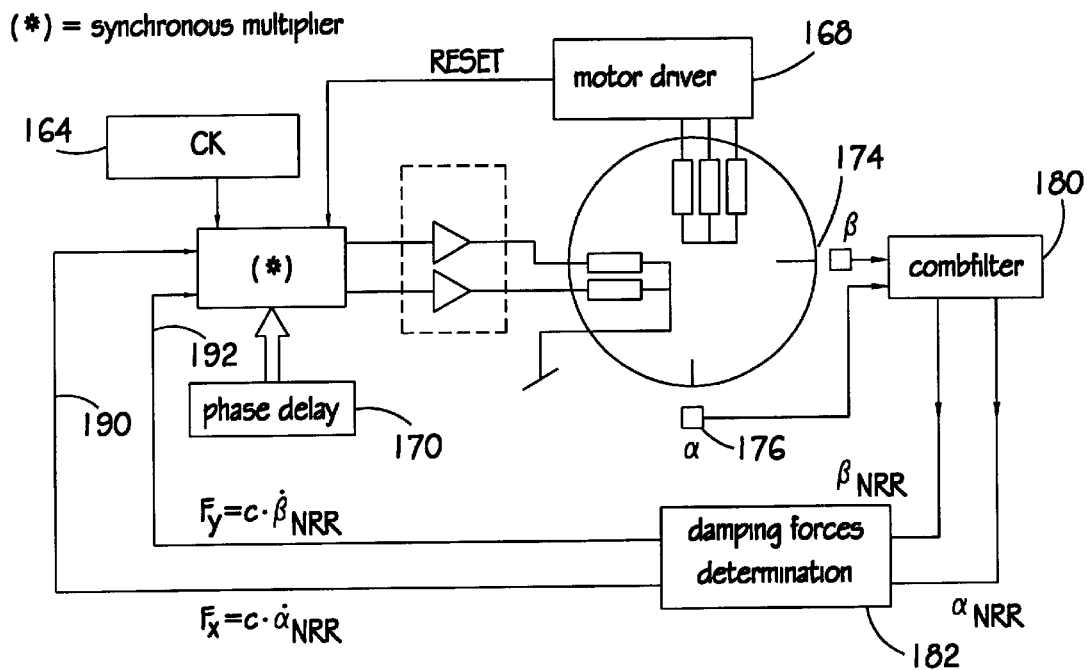

FIG. 16 is a block diagram of a complete system for detecting the motion to be damped in terms of $\alpha$ and $\beta$, and controlling currents in the motor to generate damping forces. Two sensors 174, 176 (which may be capacitive probes) measure the angular position of the axis of rotation given by $\alpha$ and $\beta$. A comb filter 180 takes out the repetitive parts of the signal that are created by the repetitive run out. The resulting signals $\alpha_{NRR}$ and $\beta_{NRR}$, which give the angular position of the axis of rotation, are used to calculate the x and y components of a damping force using a derivative operation 182. This derivative operation is an algorithm which is well known in mathematical fields and is not spelled out here in detail. The Cartesian components of the damping force are the inputs 190, 192 of the synchronous multiplier that calculates the two currents that must flow through the force generating windings 150, 152 to create the damping force.

Figure 17A:
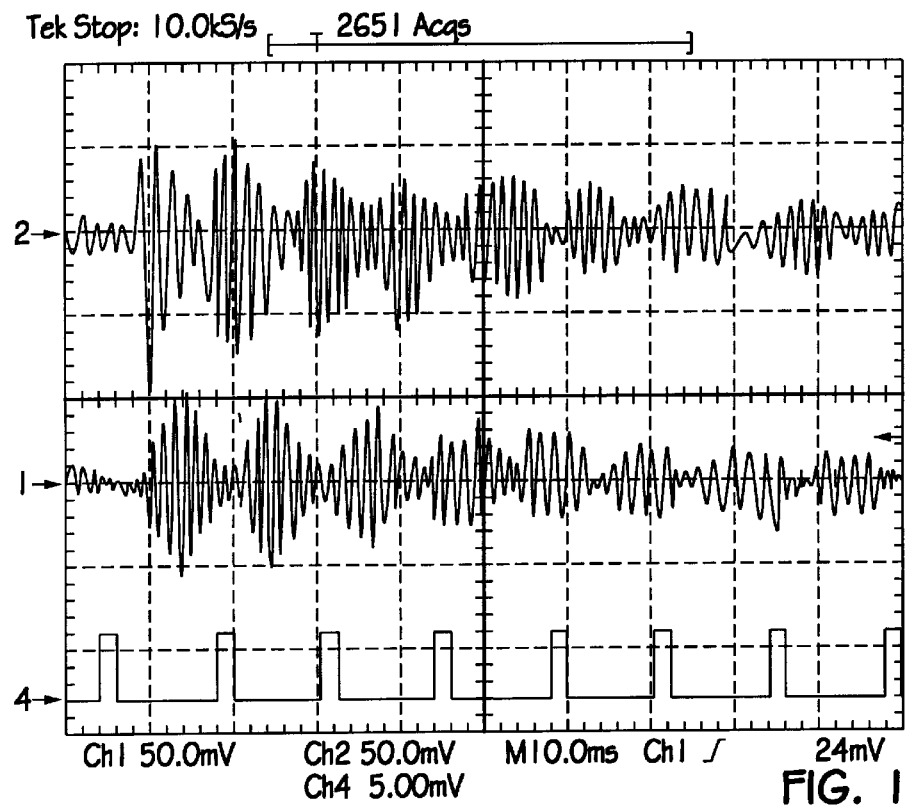
FIGS. 17A–17D are tests of an exemplary spindle motor showing the effectiveness of the present invention.

FIGS. 17A–17D are included to demonstrate the improvement achieved by the present invention. FIG. 17A gives a measurement of the response to an impact applied on a disc of a spindle motor. The measured curves are angular rotation $\alpha$ of the axis of rotation, angular rotation $\beta$ of the axis of rotation, and trigger signal that gives one impulsion per revolution. This measurement shows that the impact applied on the disc creates a low damped resonant movement of the axis of rotation of the rotor and the disc. This movement lasts at least during 8 revolutions of the spindle.

Figure 17B:
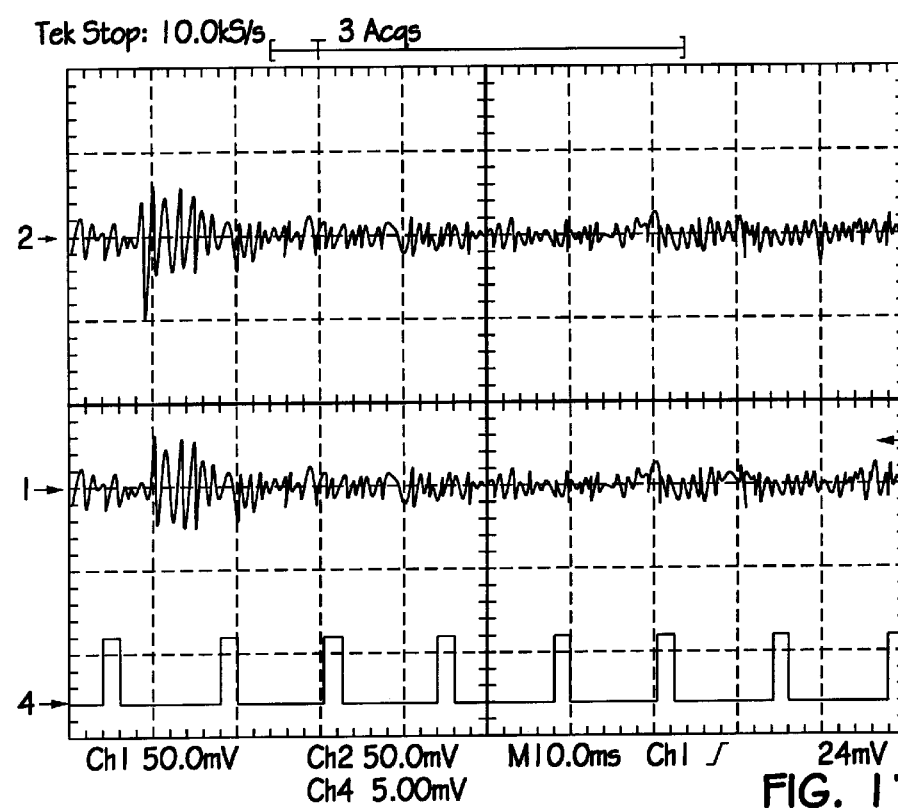

FIG. 17B gives a measurement of the response to an impact applied on the disc of a spindle motor actively damped by the active system described above. The measured curves are angular rotation $\alpha$ of the axis of rotation, angular rotation $\beta$ of the axis of rotation, and trigger signal that gives one impulsion per revolution. This measurement shows that the impact applied on the disc creates a well damped resonant movement of the axis of rotation of the rotor and the disc. This movement lasts less than 1 revolution of the spindle.

Figure 17C:
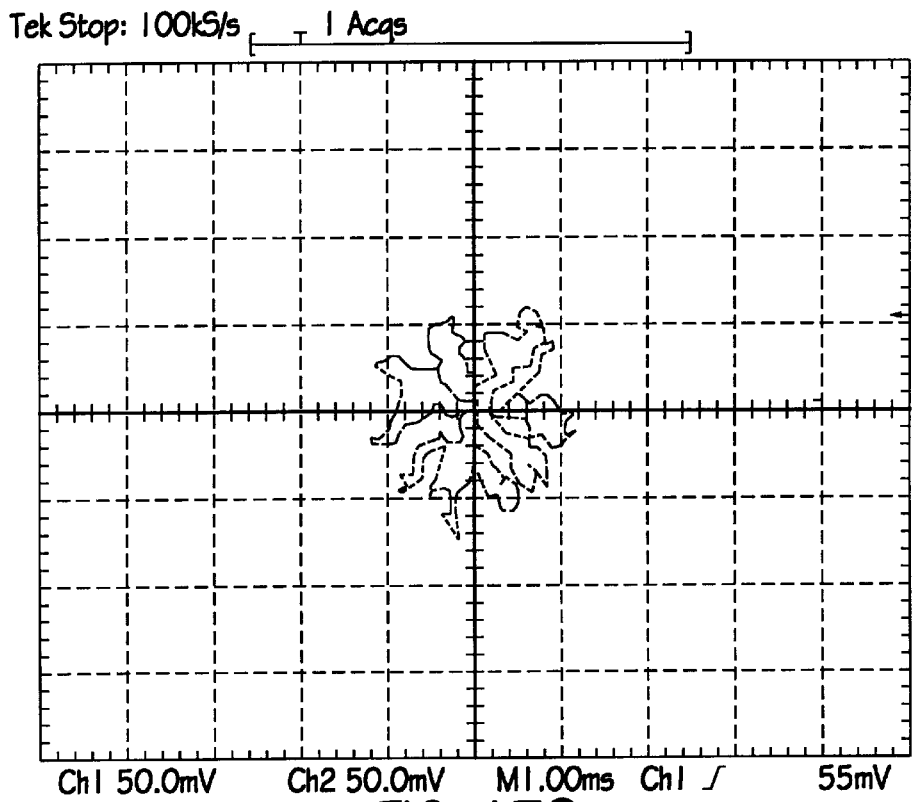

FIG. 17C gives a Lissajou plot of the response to an impact applied on the disc of a spindle motor not actively damped. The measured curves are angular rotation $\alpha$ of the axis of rotation, and angular rotation $\beta$ of the axis of rotation.

Figure 17D:
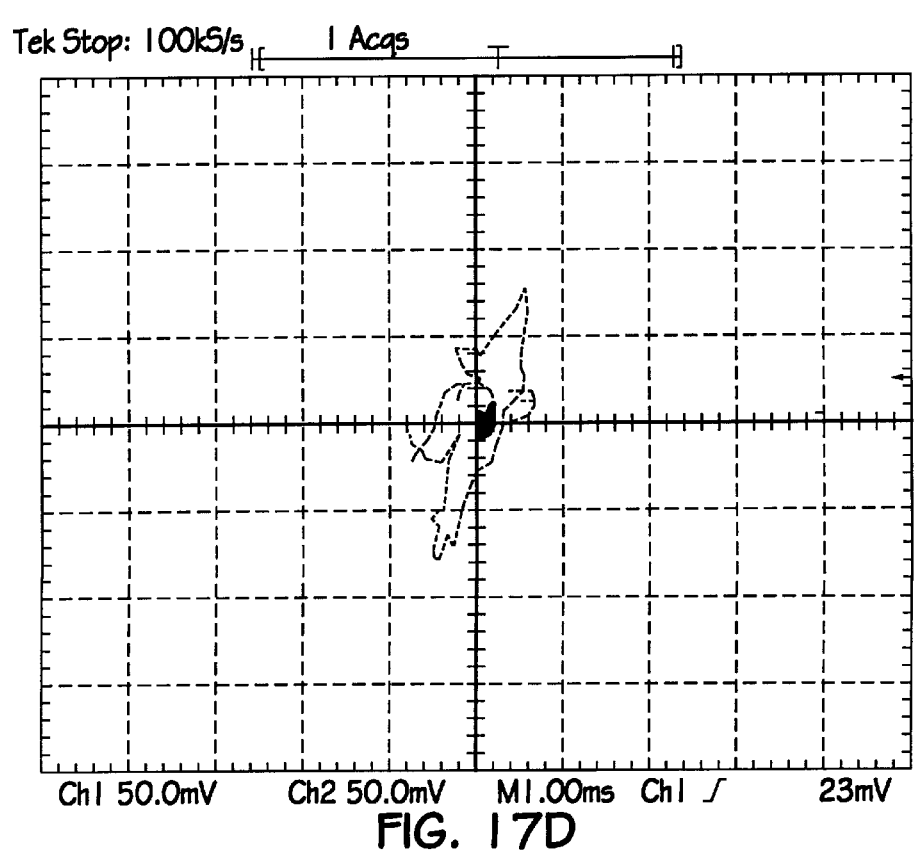

FIG. 17D gives a Lissajou plot of the response to an impact applied on the disc of a spindle motor actively damped by the active system described above. The measured curves are angular rotation $\alpha$ of the axis of rotation, and angular rotation $\beta$ of the axis of rotation.

Figure 11:
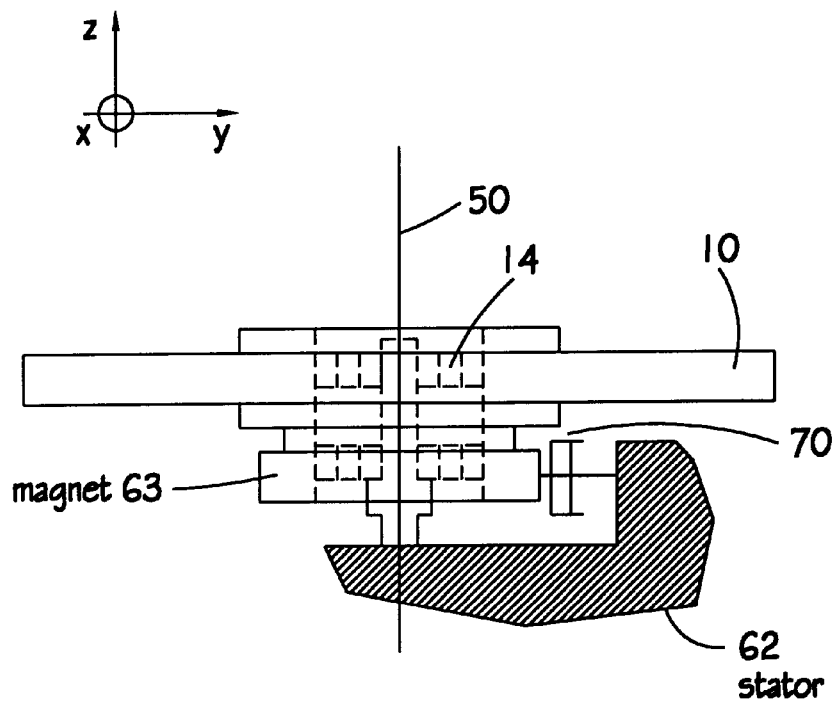
FIG. 11 is an example of the addition of an active damping system to a spindle motor.
Figure 12:
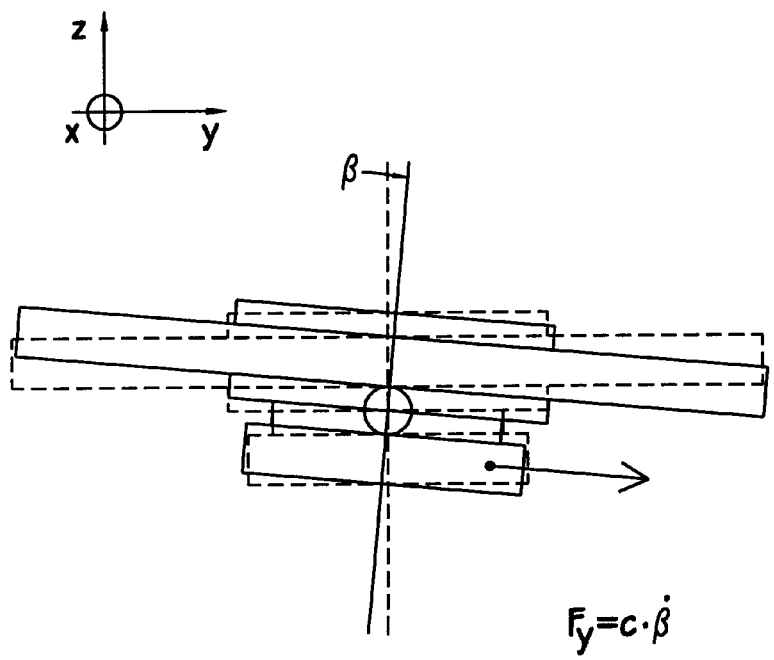
FIG. 12 illustrates movement of the system of FIG. 11 in response to an impact and demonstrates calculation of the force as the derivative of the position of the spin axis.

In summary, to reduce the magnitude of the oscillations in a system such as a disc mounted on a spindle motor whose basic elements are represented in FIGS. 11 and 12, an active system is added to a disc drive supporting the disc. In this example, the active system introduces damping to create two radial forces that are proportional to the derivatives of the angular rotation α, β. The effectiveness of this system assumes that the center of mass of the system under consideration is on the rotational axis 50 between the bearings. The disc 10 is rotating on a hub supported on bearings 14. Rotation is about the axis 50, in response to the interaction of the magnet 60 with laminations and coils 62. To damp out any oscillation to the gyroscopic movement as described above, the radial forces could be applied to the rotor magnet by applying a secondary electromagnetic field. This electromagnetic field is applied to the magnet, and is proportional to the velocity of the gyroscopic movement of the disc, and would damp out this movement of the disc and provide a stable disc movement.

A simulation based on the set of equations 5 set out above has established that the rotational axis of the rotating inertia would then move according to a rotating gyroscopic mode that is rapidly damped by the active system. Compare FIGS. 10A, 10B and 10C to FIGS. 8A, 8B and 8C, respectively, which show the rapid damping out of the oscillatory movement which simulations have shown can be achieved by this method.

The example presented above deals with the particular case for which the forward and backward gyroscopic modes are damped. The introductory portion of the description of the preferred embodiment establishes that these are modes with amplitudes high enough to cause head positioning errors in disc drive applications. It can be established further that these could also be the cause of significant error in other rotating system applications.

Figure 2:
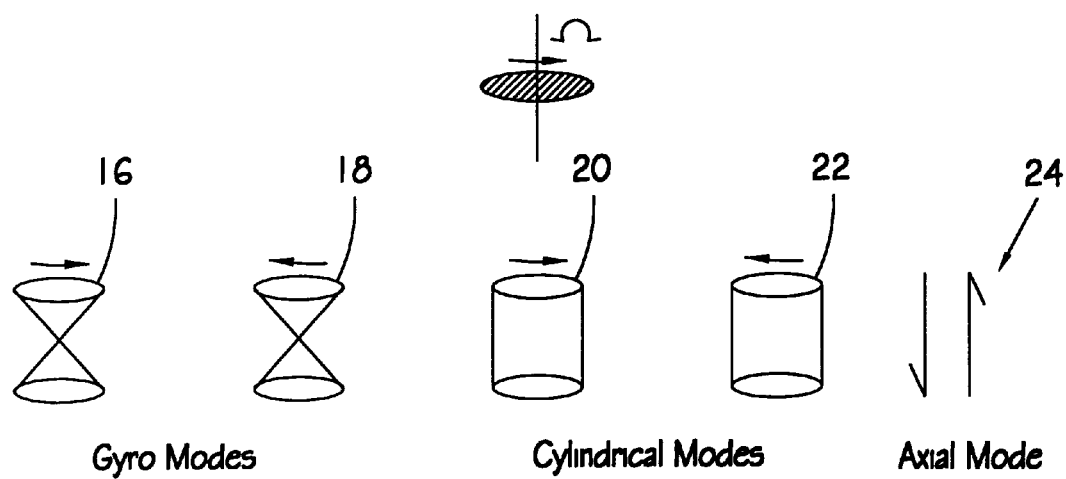
FIG. 2 illustrates the modes of movement for a spin axis.

For other applications or other rotating systems, it may be necessary or desirable to damp 5 modes shown in FIG. 2: the forward and backward rotating gyroscopic mode, the forward and backward rotating cylindrical mode; and the axial mode. Such an active system would then be required to supply at least (A) two radial forces (applied on the rotational axis on each side of the center of mass) and (B) a vertical force applied in the z direction.

It should also be noted that the inventive method has been explained in terms of developing a representation of vibrating movement and then taking a derivative thereof It should be noted that such derivative could be in time or space; it is only necessary that the velocity of the movement of the system be represented. For that matter, a representation of the velocity of motion may be directly developed by an appropriate sensor.

Other alternatives to the present invention may be apparent to a person of skill in the art who studies the present invention disclosure, which is limited only by the scope of the following claims:

What is claimed is:

1. A method of damping resonances in a rotating system comprising a spindle motor having a central shaft defining the central, rotational axis of the system and supporting at least one disc which is subject to a undamped vibrating movement;

developing a representation of vibrating movement in the rotating system;

taking the derivative of that representation;

applying an out-of-phase active, radial damping force based on said derivative to said rotating system to damp out said movement.

2. A method as claimed in claim 1 wherein the vibrating movement is defined as a function of two angular rotations α and β which are radial and orthogonal to one another.

3. A method as claimed in claim 2 wherein said rotating system introduces two radial damping forces which are proportional to the derivatives of the angular rotation α and β.

4. A method as claimed in claim 3 wherein the radial damping forces are applied to said central shaft below said disc.

5. A method as claimed in claim 4 wherein the central shaft is supported on upper and lower bearings, and a center of mass of the system is defined between the bearings.

6. A method as claimed in claim 5 wherein said central shaft supports a rotor magnet which rotates with said shaft, said radial active damping forces being applied to said shaft.

7. A method of micropositioning of the spin axis for damping mechanical vibration in a rotating system including a disc supported for rotation by a spindle motor, the method comprising applying a rotating force vector created by an actuator and controlled by the position of the spin axis as measured by a sensing device, wherein:

a) the force vector being in phase quadrature with respect to the measured position or displacement of said spin axis;

b) the force being proportional to the velocity of movement of the spin axis position and in phase opposite to said velocity; and c) the force comprising two radial damping forces which are radial and orthogonal to one another.

8. A method as claimed in claim 7 wherein the mechanical vibration is defined as a function of two angular rotations α and β which are radial and orthogonal to one another.

9. A method as claimed in claim 8 wherein said rotating system introduces two radial damping forces which are proportional to the derivatives of the angular rotation α and β.

10. A method as claimed in claim 9 wherein the radial damping forces are applied to a central shaft below said disc.

11. A method as claimed in claim 10 wherein the central shaft is supported on upper and lower bearings, and a center of mass of the system is defined between the bearings.

12. A method as claimed in claim 11 wherein said central shaft supports a rotor magnet which rotates with said shaft, said radial damping forces being applied to said shaft.

13. A method of stabilizing the central rotational axis of a rotating system in a given position, said rotating system comprising a spindle motor having a central shaft, a rotor comprising an inertial load and bearing means to support said rotor for rotation relative to said shaft, said inertial load further comprising at least one disc supported from a hub rotating with the rotor and rotating about a spin axis and subject to undamped vibratory movement, the method including developing a representation of position of spin axis or the oscillatory movements of said spin axis; and analyzing said representation to calculate and generate radial damping forces which in turn stabilize the position of the spin axis and dampen oscillatory and/or vibratory movements of said axis.

14. A method as claimed in claim 13 wherein the forces applied are established to be proportional to either a derivative of position of the rotor or a velocity of oscillatory movement of said rotor.

15. A method as claimed in claim 14 wherein the rotating system includes an electromagnetic actuator, and the method includes applying the forces utilizing said electromagnetic actuator.

16. A method as claimed in claim 15 wherein said electromagnetic actuator comprises stationary windings supported from said shaft and rotating magnets supported from the rotor surrounding said spin axis, and said method includes energizing said stationary winding to apply said forces to dampen said oscillatory movements.

17. A method as claimed in claim 16 wherein said rotating system includes said motor surrounding said spin axis and comprising magnets and windings rotating relative to one another.

18. A method as claimed in claim 17 wherein the magnets of said motor and the magnets of said electromagnetic actuator are a common set of magnets.

19. A method as claimed in claim 13 wherein the undamped vibratory movement is defined as a function of two angular rotations $\alpha$ and $\beta$ which are radial and orthogonal to one another.

20. A method as claimed in claim 19 wherein the radial damping forces are applied to said central shaft at a point axially spaced from said discs.

21. A method as claimed in claim 20 wherein the central shaft is supported on upper and lower bearings, and a center of mass of the system is defined between the bearings.

22. A method as claimed in claim 21 wherein said central shaft supports a rotor magnet which rotates with said shaft, said radial damping forces being applied to said shaft.

* * * * *